United States Patent [19]

Möndel

[11] Patent Number: 5,768,753
[45] Date of Patent: Jun. 23, 1998

[54] DEFLECTION FITTING FOR A SAFETY BELT

[75] Inventor: Karl Möndel, Schwäbisch Gmünd, Germany

[73] Assignee: TRW Occupant Restraint Systems GmbH, Alfdorf, Germany

[21] Appl. No.: 786,895

[22] Filed: Jan. 23, 1997

[30] Foreign Application Priority Data

Jan. 30, 1996 [DE] Germany ............... 296 01 566 U

[51] Int. Cl.⁶ ...................................................... A44B 11/00
[52] U.S. Cl. .......................... 24/265 BC; 24/464; 24/588
[58] Field of Search ............................. 24/265 BC, 588, 24/464; 297/483; 280/806, 808, 801.2

[56] References Cited

U.S. PATENT DOCUMENTS

| | | | |
|---|---|---|---|
| 3,640,317 | 2/1972 | Panfili | 24/20 W |
| 3,959,855 | 6/1976 | Fisher | 297/483 |
| 4,023,826 | 5/1977 | Kokubo et al. | 297/483 |
| 4,102,020 | 7/1978 | Lindblad | 297/483 |
| 4,142,274 | 3/1979 | Scholz et al. | 297/483 |
| 4,291,919 | 9/1981 | Schmid et al. | 280/801.1 |
| 4,527,313 | 7/1985 | Sylven et al. | 24/265 BC |
| 4,737,245 | 4/1988 | Befeld | |
| 5,207,452 | 5/1993 | Collins | |
| 5,513,880 | 5/1996 | Ohira et al. | 297/483 |

FOREIGN PATENT DOCUMENTS

| | | |
|---|---|---|
| 0212668 | 3/1987 | European Pat. Off. |
| 2228127 | 1/1974 | Germany |
| 3022178 | 12/1981 | Germany |
| 7813861 | 12/1990 | Germany |
| 4214600 | 11/1992 | Germany |

*Primary Examiner*—Victor N. Sakran
*Attorney, Agent, or Firm*—Tarolli, Sundheim, Covell, Tummino & Szabo

[57] ABSTRACT

A deflection fitting for a safety belt is provided, comprising an attachment section having an eyelet, a deflection web, and bent connection sections provided at each axial end of the deflection web and connecting the deflection web to the attachment section so that a closed ring is formed which surrounds a feed-through slot for a safety belt. The attachment section, the deflection web and the bent connection sections are formed integrally as a diecast part made of aluminium or an aluminium alloy.

14 Claims, 2 Drawing Sheets

5,768,753

DEFLECTION FITTING FOR A SAFETY BELT

TECHNICAL FIELD

The invention relates to a deflection fitting for a safety belt.

BACKGROUND OF THE INVENTION

A deflection fitting for a safety belt usually comprises an attachment section having an eyelet, and a deflection web which is connected to the attachment section by a bent connection section at each of its ends to form a closed ring which surrounds a feed-through slot for the belt webbing.

Such a deflection fitting normally consists of a stamped steel part encased in plastic. The steel part guarantees the necessary strength of the deflection fitting, while the desired surface structure can be achieved by means of the plastic casing. The disadvantage of such a deflection fitting is in particular the comparatively high weight.

BRIEF SUMMARY OF THE INVENTION

The present invention provides a deflection fitting whose weight is reduced in comparison to conventional deflection fittings, without forfeiting any of the strength or design possibilities of the surface structure. According to the invention, a deflection fitting for a safety belt comprises an attachment section having an eyelet, a deflection web, and bent connection sections provided at each axial end of the deflection web and connecting the deflection web to the attachment section so that a closed ring is formed which surrounds a feed-through slot for a safety belt. The attachment section, the deflection web and the bent connection sections are formed integrally as a diecast part made of aluminium or an aluminium alloy.

The invention is based on the perception that if comparable cross-sections are assumed, a deflection fitting made of aluminium or an aluminium alloy will be of a lower weight and still have at least as high a strength or breaking load as a deflection fitting made of a steel part encased in plastic. Since aluminium or an aluminium alloy are sufficiently easy to process, refraining from using the plastic casing does not lead to any losses with respect to the design possibilities of the surface structure.

In accordance with a preferred embodiment of the invention, provision is made for a deflection surface for the belt webbing being arranged directly at the deflection web. This means that the deflection web is not encased in plastic. No sharp-edged deformations, which are possible with deflection fittings encased in plastic and which can lead to tearing of the very taut belt webbing, can thus occur even if the belt webbing and thus the deflection fitting are subjected to extremely high loads.

In a deflection fitting in accordance with the invention, provision can also be made for the deflection surface of the deflection fitting being equipped with a friction-reducing surface structure. This reduces the forces occurring in the safety belt when the safety belt is used, so that the comfort of the user is augmented.

In a deflection fitting in accordance with the invention, provision can also be made for the surface of the deflection fitting being at least partly anodised. In this way the deflection fitting can, if required, be produced in a variety of colours through colour anodising.

Further advantageous developments of a deflection fitting in accordance with the invention are given in the subclaims.

BRIEF DESCRIPTION OF THE DRAWING

The invention is described in the following with reference to an embodiment which is illustrated in the enclosed drawings. In these, FIG. 1 a diagrammatic top view of a deflection fitting in accordance with the invention.

DETAILED DESCRIPTION OF A PREFERRED EMBODIMENT

Figure 1:
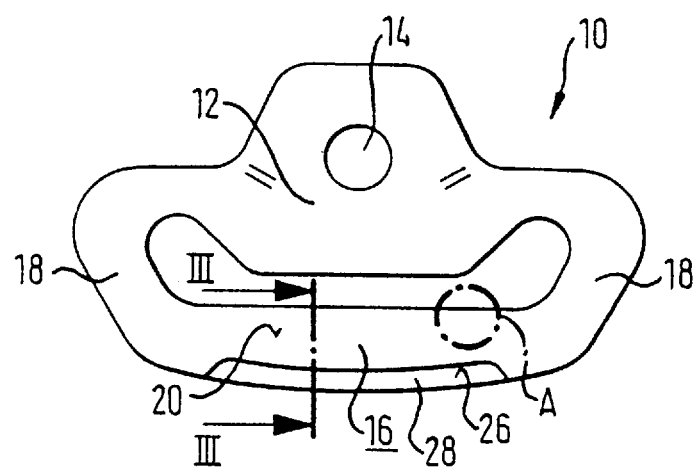

The illustrated deflection fitting 10 is a one-piece diecast part made of aluminium or an aluminium alloy. It consists of an attachment section 12 in which is located an eyelet 14 in which a bolt (not illustrated) can be inserted; the deflection fitting 10 can, for example, be fastened to the B-pillar of a vehicle with this bolt. The deflection fitting 10 also has a deflection web 16 which is connected to the attachment section 12 by means of bent connection sections 18. A deflection surface 20, where contact takes place between the deflection fitting 10 and a safety belt to be deflected (not illustrated), is located on the deflection web 16.

Figure 2:
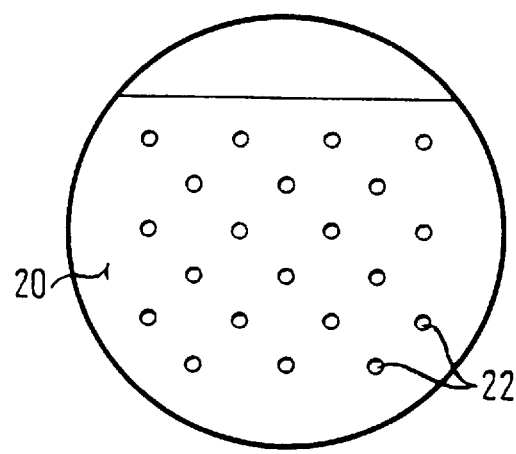
FIG. 2 an enlargement of detail A from FIG. 1.
Figure 3:
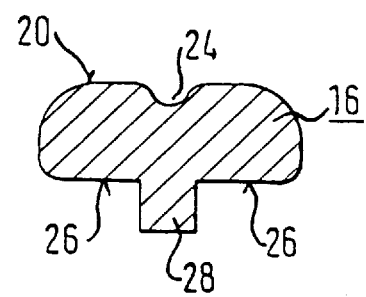
FIG. 3 shows an enlargement of a section along the line III—III from FIG. 1.

As is known from deflection fittings encased in plastic in accordance with prior art, the deflection surface of the deflection fitting in accordance with the invention can be equipped with a friction-reducing surface structure. An example of such a friction-reducing surface structure is shown in FIG. 2. A large number of indentations 22, recessed in the otherwise smooth deflection surface 20, can be seen in this illustration. Additionally or alternatively, such a friction-reducing surface structure can also have a groove 24 as shown in FIG. 3, extending over the deflection surface transversely to the direction of movement of the safety belt. The friction-reducing surface structure can be achieved during the manufacture of the deflection fitting in accordance with the invention through appropriate design of the casting mould. It is furthermore possible to coat the deflection surface with Teflon.

Furthermore, it can be seen in FIGS. 1 and 3 that the deflection web has two recesses 26 extending in the longitudinal direction of the deflection web on the side facing away from the attachment section and outside the deflection surface 20. Between these recesses there remains a rib 28 extending in the longitudinal direction along the deflection web 16. These recesses can lead to a significant reduction in the weight of the deflection fitting 10 without its strength being noticeably reduced, since the increased thickness of the deflection fitting 10 in the region of the recesses of the rib 28 contributes to the moment of resistance of the deflection web 16 very much more than the width, which is reduced in this region by the recesses.

Furthermore, provision can also be made for the surface of the deflection fitting in accordance with the invention being at least partly anodised. In this way the surface of the deflection fitting in accordance with the invention can, if required, be anodised in a variety of colours.

I claim:

1. A deflection fitting for a safety belt, comprising an attachment section having an eyelet, a deflection web, and bent connection sections provided at each axial end of said deflection web and connecting said deflection web to said attachment section so that a closed ring is formed which surrounds a feed-through slot for a safety belt, said attachment section, said deflection web and said bent connection sections being formed integrally as a diecast part made from a material selected from the group consisting of aluminum and aluminum alloys, said deflection fitting further including a deflection surface for a safety belt formed directly on said deflection web.

2. The deflection fitting of claim 1, wherein said deflection surface is equipped with a friction-reducing surface structure.

3. The deflection fitting of claim 2, wherein said deflection surface is provided with a large number of indentations recessed in the said deflection surface, said deflection surface being, apart from said indentations, smooth.

4. The deflection fitting of claim 2, wherein said deflection surface is provided with at least one groove extending over said deflection surface transversely to a direction of movement of a safety belt.

5. The deflection fitting of claim 1, wherein said deflection surface is coated with Teflon.

6. The deflection fitting of claim 1, wherein a surface of said deflection fitting is anodised.

7. The deflection fitting of claim 6, wherein said anodised surface is coloured.

8. The deflection fitting of claim 1, wherein said deflection web is formed with at least one recess extending in a longitudinal direction of said deflection web on a side facing away from said attachment section and outside said deflection surface, whereby at least one rib extending in said longitudinal direction of said deflection web is formed.

9. A deflection fitting for a safety belt, said deflection fitting comprising:

an attachment section having an eyelet;

a deflection web; and bent connection sections provided at each axial end of said deflection web and connecting said deflection web to said attachment section to form a closed ring surrounding a feed-through slot for a safety belt;

said attachment section, said deflection web and said bent connection sections being integral and a diecast part made from a homogeneous material selected from the group consisting of aluminum and aluminum alloys;

said deflection fitting further including at least one rib extending in a longitudinal direction of said deflection web.

10. The deflection fitting of claim 9 wherein a deflection surface for a safety belt is formed directly on said deflection web.

11. The deflection fitting of claim 10 wherein said deflection surface includes a friction-reducing surface structure.

12. The deflection fitting of claim 11 wherein said deflection surface includes a large number of indentations recessed in the said deflection surface, said deflection surface being, apart from said indentations, smooth.

13. The deflection fitting of claim 11 wherein said deflection surface is provided with at least one groove extending over said deflection surface transversely to a direction of movement of a safety belt.

14. The deflection fitting of claim 10 wherein said deflection web is formed with at least one recess extending in said longitudinal direction of said deflection web on a side facing away from said attachment section and outside deflection surface.

* * * * *